Fig.I.

Jan. 20, 1953     C. E. BASTON     2,626,374
LOCOMOTIVE REGENERATION CONTROL
Filed Oct. 2, 1950     2 SHEETS—SHEET 2

Fig.2.

INVENTOR
Cyril E. Baston.
BY O.B. Buchanan
ATTORNEY

Patented Jan. 20, 1953

2,626,374

UNITED STATES PATENT OFFICE 2,626,374

LOCOMOTIVE REGENERATION CONTROL

Cyril E. Baston, Glenshaw, Pa., assignor to Westinghouse Electric Corporation, East Pittsburgh, Pa., a corporation of Pennsylvania Application October 2, 1950, Serial No. 188,003

24 Claims. (Cl. 318—63)

My invention relates to control-systems which are particularly adapted for controlling a plurality of traction-motors on a locomotive or other electrically propelled vehicle. My invention has particular relation to such railway-type control-systems in which regenerative braking is provided for, and in which the motor-armatures are adapted to be connected in any one of a plurality of different series and parallel motor-combinations, both during motoring and during regeneration. During motoring, the series field-windings of the motors are connected in series-circuit relation in circuit with their respective motor-armatures, while, for regeneration, these field-windings are energized from a separate source of excitation.

It has been the standard practice, since the earliest days of traction-motor control, to effect the transitions between one motor-combination connection, such as the series connection, and another motor-combination connection, such as the parallel connection or a series-parallel connection (depending upon the number of motors), by momentarily short-circuiting some of the motors, and then disconnecting the original circuit-connections for these short-circuited motors and reconnecting the said motors in the desired new motor-combination. This series of transitional operations is quite satisfactory for motoring, and is the accepted practice; but it can not be permitted during regenerative braking, because then the motor-fields are energized from a separate exciter, and the short-circuit currents of such separately excited motors (operating as generators) would be too great for the motors to stand, and would impose intolerable braking-surges on the locomotive and on the train being hauled thereby.

As a consequence, it has become the practice, prior to my present invention, to use a separate controller-drum for controlling the motor-combination switching, in traction-motor control-systems using regenerative braking with a plurality of motor-connections in different series and parallel motor-combinations. This has enabled the engineman to change the motor-combination during regenerative braking, without short-circuiting an excited motor, and without imposing intolerable braking-surges on the locomotive or other self-propelled vehicle. It has necessitated the use of three controller-handles for setting up the desired motor-combination during regeneration, these drums being the braking-drum which controls the amount of separate excitation which is applied to the field-windings of the motors, a main or accelerating drum for controlling the accelerating-resistances or other armature-current controlling-means, and a motor-combination drum or selector-switch for selecting the particular series, or parallel, or series-parallel motor-combination which is desired. These are more handles than can be controlled by two hands at one time, requiring the engineman to let go of one handle and grab another, then returning to the first handle, in a rather complicated series of movements. It has also necessitated the provision of a number of rather seriously complicated electrical interlocks between the various circuits, and mechanical interlocks between the various drums, and this was quite a disadvantage, because the more interlocks there are, electrical or mechanical, the more sources there are for failure or erroneous operation of the equipment.

An object of my present invention is to provide a motor-control system of the type described, in which the separate motor-combination controller-drum may be eliminated, and yet without involving the short-circuiting of a separately excited motor during any transition-period during regenerative operation, or in setting up a desired motor-combination for a prospective regenerative operation. To this end, I provide an extra second notch on the braking-drum, interposed between the motoring or off-notch of the braking-drum, and the first on-notch of the braking-drum. I use this extra notch as a means for holding open the line-switches, while the main drum is being used to set up the desired motor-combination connections for regenerative braking, after which the braking-drum can then be moved to its various on-positions for closing the line-switches and establishing and controlling the regenerative-braking conditions. I also provide special interlocks, which are effective during regenerative braking, for preventing the motor-combination connections from being changed while the main controller-drum is being moved back to its off-position in the process of either discontinuing the regenerative braking, or setting up a change in the motor-combination connections during regenerative braking. I also provide various mechanical interlocks for restricting the movements of the main and braking drums to the new sequences which are required by my new control.

With the foregoing and other objects in view, my invention consists in the systems, combinations, circuits, apparatus, parts and control, hereinafter described and claimed, and illustrated in the accompanying drawings, wherein:

Figure 1:
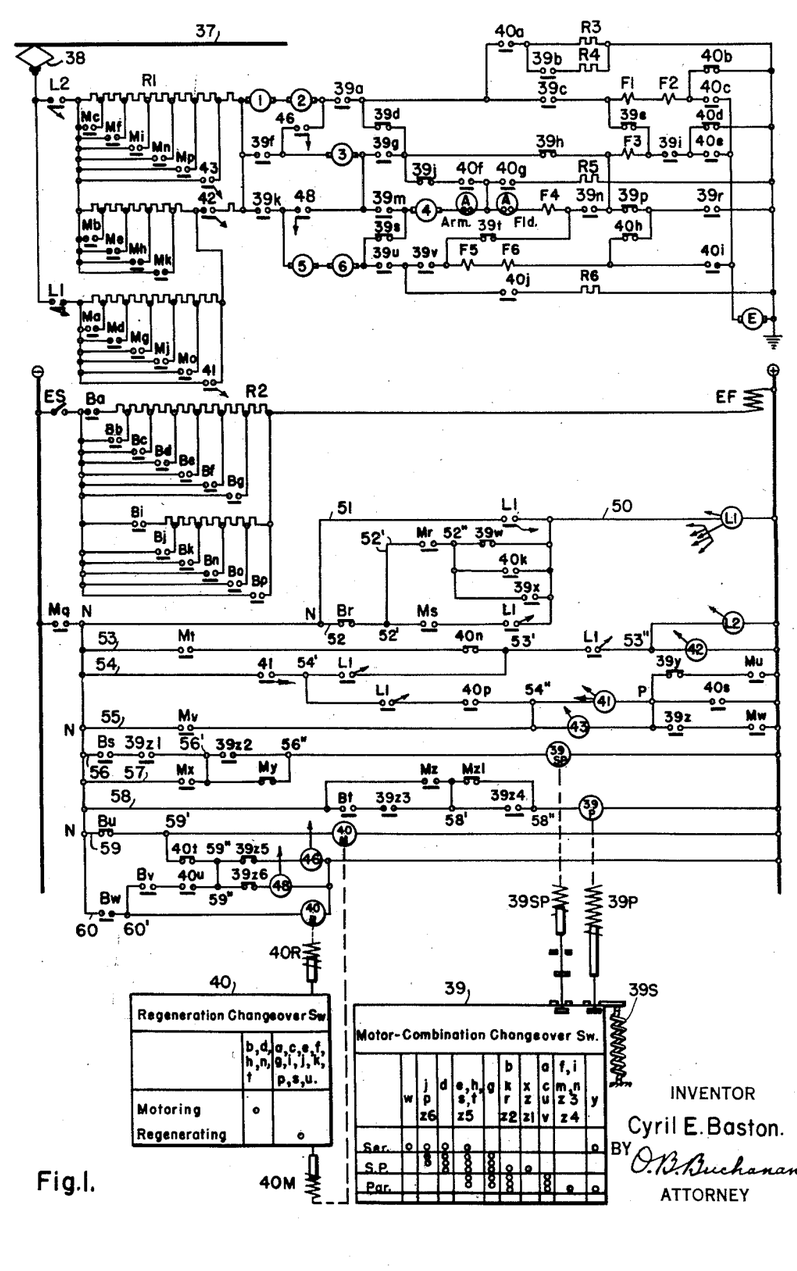
Figure 1 is a much simplified diagrammatic view of circuits and apparatus illustrating the principles of my invention, without showing irrelevant or non-cooperative features, such as a reversing drum, motor-field shunting, various pantograph-control interlocks, motor-cutouts, overcurrent lock-outs, wheel-slipping control, and many other features which make up a complicated locomotive control-system, as is well understood in the art, but not necessary, here, to an understanding of the essential novel features of my present invention.

Fig. 1 is a schematic, or "across the line" diagram, so far as practicable. The various mechanical connections between separated parts are indicated by arrows or dotted lines. Each relay, contactor, or electrically operated or controlled switching-device (these terms being herein used interchangeably), is indicated by a separate letter-designation or legend, which is applied to the operating-coil and to all of the contacts of the relay, as a further convention for symbolically tying the various relay-parts together. All relays and switches are shown in the deenergized position. The main drum M, and the braking-drum B, are not shown as a whole in Fig. 1, but their various drum-contacts are indicated by suitable letters, from Ma to Mzl for the main drum M, and from Ba to Bw for the braking drum B, these various drum-contacts being lettered in an orderly fashion in accordance with the position in which they appear in the circuits of Fig. 1, so as to facilitate the finding and tracing of the various contacts and circuits, while the drum-notches, in which the various contacts of said main and braking-drums M and B are closed, are indicated schematically in Fig. 2.

Figure 2:
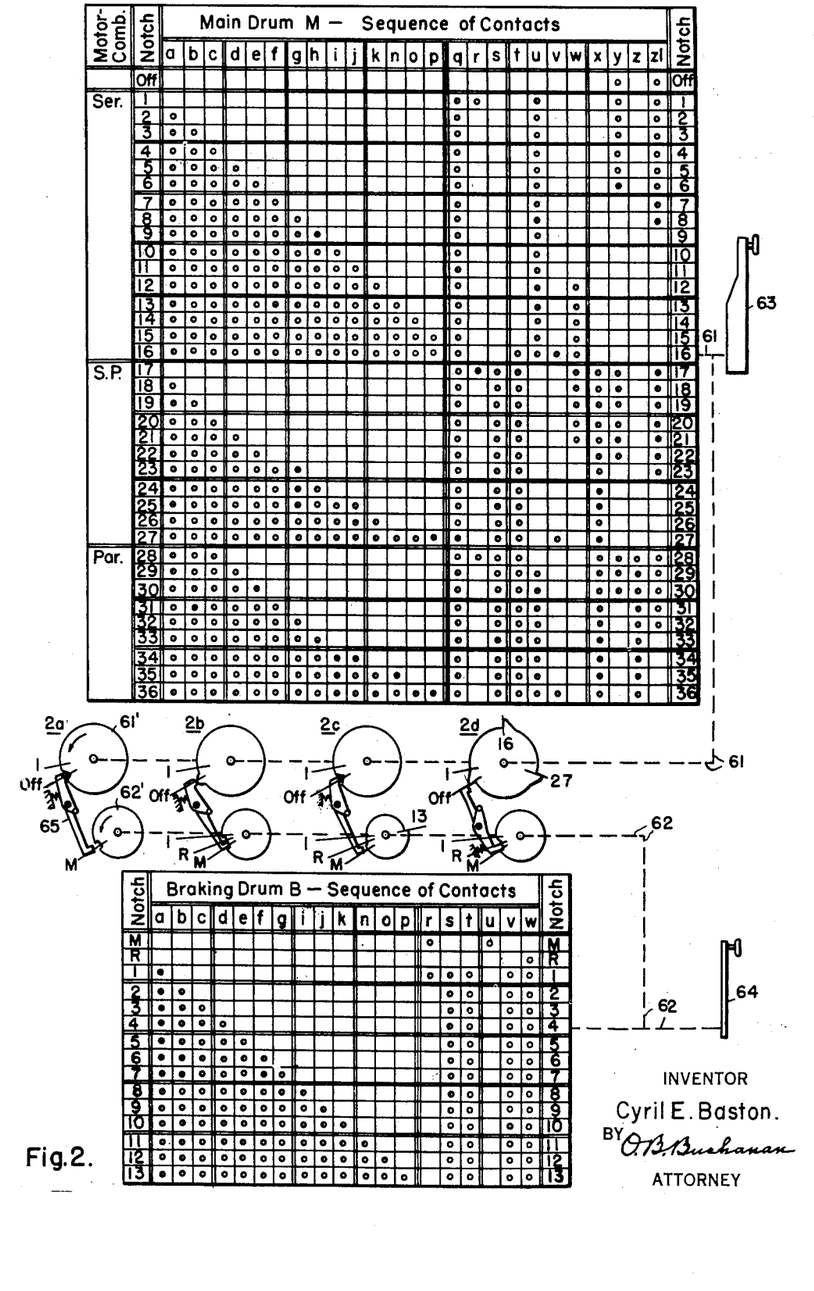
Fig. 2 is a diagrammatic view of the main and braking-drums, showing their sequences of contacts, and the mechanical interlocking-means in accordance with my invention.

The particular main drum M which has been chosen for illustration in Fig. 2 has an off-notch and thirty-six on-notches, numbered 1 to 36; while the illustrated braking-drum B has an off-notch or motoring-notch, marked M, an extra off-position regeneration-notch marked R, and thirteen on-position regeneration-notches, marked 1 to 13.

The motor-control system which has been chosen for illustration in Fig. 1 uses six direct-current traction-motors, each having an armature and a series field-winding. The motor-armatures are numbered 1 to 6, in Fig. 1, in accordance with the usual practice, and the respective field-windings are numbered from F1 to F6. The power-supply conductor is shown in the form of a trolley-wire 37, which is engaged by a pantograph 38 carried by the locomotive or other vehicle. Two electrically controlled line-switches L1 and L2 are shown, having main-circuit make-contacts L1 and L2 for connecting the motor-armatures 1 to 6 between the pantograph 38 and the rails or ground. A series-connected accelerating resistance-means R1 is shown, as representative of means for controlling the magnitude of the armature-currents of the motors. A separate exciter E is shown, for separately exciting the motor-fields F1 to F6 during regenerative operation. This exciter E has an exciter-field EF, which is shown as being connected between battery-terminals (+) and (−) through an exciter-rheostat R2, an exciter-switch ES, and the first on-position contact Ba of the braking-drum B. I have also shown, in Fig. 1, four stabilizing resistors R3 to R6, which are used in a well-known manner during regenerative operation.

In addition to the above-mentioned equipment, I have shown two changeover-switches 39 and 40, in Fig. 1. Both of these switches are shown as being drum-type switches, having a sequence of contact-closure as diagrammatically shown in the respective rectangles or block-diagrams 39 and 40 at the bottom of Fig. 1.

The first changeover-switch 39 is a multi-position motor-combination switching-means, having a plurality of running-positions for connecting the motor-armatures 1 to 6 in any one of a plurality of different series and parallel motor-combinations. In the illustrated control-system, there are three different motor-combinations, namely series (Ser.), series-parallel (S. P.), and parallel (Par.). This motor-combination changeover-switch 39 has various contacts, marked from 39a to 39z6. The various letters designating the switch-contacts of the motor-combination switch 39 are applied in an orderly fashion, in accordance with the positions in which these contacts appear in the various circuits as shown in Fig. 1, so that the various contacts may be easily found; and the essential order in which these contacts are made is shown in the rectangular drum-representation of the motor-combination changeover-drum 39 at the bottom of Fig. 1.

The second changeover-switch 40, in Fig. 1, is a two-position regeneration changeover-switch. It is illustrated as a drum-type switch 40, having various contacts numbered from 40a to 40u, these letters being again applied in an orderly sequence, in accordance with the order in which the various contacts appear in the various circuits of Fig. 1; and the sequence in which these contacts are made is indicated in the diagrammatic drum-representation 40 at the bottom of Fig. 1.

The two changeover-switches 39 and 40 are mechanically operated under electrical control. The electrical control may be either used to operate these switches directly, by the use of a magnetic force which is suitably applied to the switches, or the controlling effects of the electromagnets can be transmitted to the changeover-switches 39 and 40 by means of magnetically controlled air-engines or other motive-means (not shown). For simplicity of illustration, I have shown these changeover-switches as being directly actuated by various electromagnets 39SP, 39P, 40M and 40R, but this illustration is intended to be broadly symbolic of any kind of electrical control for bringing about the operation of the changeover-switches, regardless of the motive-power which is used for effecting the mechanical movement of the switches.

The motor-combination changeover-switch 39 is normally held in its series position (Ser.) by suitable biasing-means, such as a spring 39S; it is actuated to its series-parallel position (S. P.) by an energization of the electromagnet 39SP; and it is actuated into its parallel position (Par.) by an energization of the electromagnet 39P. The schematically shown mechanical connections between the electromagnet 39SP and the drum 39, and between the electromagnet 39P and the drum 39, are indicated as involving a certain amount of loose play, so that, whenever the parallel-position electromagnet 39P is actuated, the motor-combination drum 39 is moved to its parallel position, regardless of the actuation or non-actuation of the series-parallel electromagnet 39SP.

The other, or "regeneration," changeover-switch 40, having only two positions, is illustrated as having the two electromagnets 40R and 40M, which are used for the regenerating-position and the motoring-position, respectively. In its motoring-position, this regeneration changeover-switch 40 connects the field-windings F1 to F6 in series-circuit relation in circuit with their respective motor-armatures; whereas, in its regenerating-position, said regeneration changeover-switch 40 connects the field-windings F1 to F6 for energization from the exciter E. This change-over-switch or drum 40 is illustrated as being of a type which remains in whatever position it is put, the electromagnet 40M being used to put it into its motoring-position, while the electromagnet 40R is used to put it in its regenerating-position.

The main motor-circuits are shown in the top half of Fig. 1. In addition to the equipment which has already been described, these main circuits include the make-contacts of five electrically controlled switches 41, 42, 43, 46 and 48. It is not believed to be necessary to trace through the details of the illustrated main circuits, in Fig. 1, because these main circuits are not new, of themselves, that is, aside from my novel control-circuits, which will be subsequently described. The essential thing concerning the main circuits is that they shall have means for connecting the motor-armatures 1 to 6 in any one of a plurality of series and parallel motor-combinations; that they shall have means for connecting the motor-fields F1 to F6 either in series-circuit connection, for motoring-operation, or in a separate-excitation connection, as to the exciter E, for regenerative operation; that they shall have some suitable line-switch means, such as L1 and L2; and that they shall have suitable current-controlling means, such as the resistance-means R1 and R2, for controlling the armature-current and the separate exciting-current, respectively. Since the engineman, in controlling the regenerative operation, as will be subsequently described, needs to have knowledge of the magnitudes of the armature and field-currents, respectively, it is necessary to have suitable ammeters for this purpose, which I have shown, in the main circuits, at A-Arm. and A-Fld., respectively, between the No. 4 motor-armature and its field F4.

Control-circuits illustrative of my invention are shown in schematic diagram, underneath the main circuits in Fig. 1. The first control-circuit 50 is used for energizing the operating coil L1 of the first line-switch L1, across the positive and negative battery-terminal buses (+) and (—). At its negative end, this control-circuit 50 includes the main-drum contact Mq, which is used to connect a conductor N to the negative terminal (—).

The first control-circuit which is connected to the negative conductor N is a holding-circuit 51, containing an auxiliary make-contact L1 of the line-switch L1, for energizing the circuit 50 which energizes the operating coil L1 of said line-switch. The initial energization for this operating coil L1 is derived from a second circuit 52, which contains the braking-drum contact Br, which energizes a conductor 52′ from the negative conductor N. The conductor 52′ is connected to a conductor 52″ by the main-drum contact Mr; and this conductor 52″ is connected to the circuit 50 through three parallel-connected contacts 39w, 40k and 39x, respectively. The conductor 52′ is also connected to the circuit 50 through two serially connected contacts, one of which is the main-drum contact Ms, which is in series with another auxiliary make-contact L1 on the line-switch L1.

The operating coil L2 of the second line-switch L2 is energized from the negative conductor N through a circuit 53, which is connected to a conductor 53′ through two serially connected contacts Mt and 40n. The conductor 53′ is connected to a circuit 53″ through a third auxiliary make-contact L1 on the first line-switch L1. The conductor 53″ is used to energize the operating coils L2 and 42 of the second line-switch L2 and the switch 42, respectively, conditioned upon the closure of the first line-switch L1, by reason of the L1 make-contact in the circuit 53′—53″.

A fourth circuit 54 is connected between the negative conductor N and a conductor 54′ through an auxiliary make-contact 41 of the switch 41, the energization of which will be described later. The conductor 54′ is connected to the conductor 53′ through a fourth auxiliary make-contact L1 of the line-switch L1. The conductor 54′ is connected to a conductor 54″ through two serially connected contacts, namely, a fifth auxiliary make-contact L1 and the contact 40p.

A fifth control-circuit 55 is connected from the negative conductor N to the conductor 54″ through the main-drum contact Mv. This conductor 54″ is used to connect the two operating coils 41 and 43 of the correspondingly numbered switches 41 and 43 to a conductor P. This conductor P is connected to the positive bus (+) through three parallel paths as follows: first through the contact 39y in series with the contact Mu, second through the contact 40s, and third through the contact 39z in series with the contact Mw.

The sixth control-circuit 56 connects the negative conductor N to a conductor 56′ through two serially connected contacts Bs and 39z1. Said conductor 56′ is connected to a conductor 56″ through either of two parallel-connected contacts 39z2 and My. The last-mentioned conductor 56″ is used to energize the coil or electromagnet 39SP of the motor-combination changeover-switch 39.

The next control-circuit 57 connects the negative conductor N to the conductor 56′ through the main-drum contact Mx.

The eighth control-circuit 58 connects the negative conductor N to a conductor 58′ through either one of two paths, the first being through the contact Mz, and the second being through the two serially connected contacts Bt and 39z3. The conductor 58′ is connected to a conductor 58″ through either one of two parallel-connected contacts Mz1 and 39z4. The conductor 58″ is used to energize the coil or electromagnet 39P of the motor-combination changeover-switch 39.

The ninth control-circuit 59 connects the negative conductor N to a conductor 59′ through the braking-drum contact Bu. Said conductor 59′ is used to energize the motoring-position coil or electromagnet 40M of the regeneration changeover-switch 40. Said conductor 59′ is also joined to a conductor 59″ through the contact 40t. This last-mentioned conductor 59″ is used for two purposes, first to energize the operating coil 46 through the contact 39z5, and second to energize the operating coil 48 through the contact 39z6.

The last control-circuit 60 connects the negative conductor N to a conductor 60′ through the braking-drum contact Bw. This conductor 60′ is used to energize the regenerating-position coil or electromagnet 40R of the regeneration changeover-switch 40. Said conductor 60' is also connected to the conductor 59" through two serially connected contacts Bv and 40u.

It is believed that the operation of my control-system will be fairly evident from the illustrated circuits in Fig. 1, when read in conjunction with the four drum-charts 39, 40, M and B, which are shown in Figs. 1 and 2.

Particular attention will be drawn, however, to the following important points.

The control-circuits N—52—52' show that the line-switch L1 can not be closed except when the drum-contacts Mq and Br are closed, the contact Mq being closed when the main drum M is in any one of its on-positions 1 to 36, while the contact Br is closed only when the braking-drum B is either in its conventional off-position or motoring-position M, or in its No. 1 on-position regenerating-notch 1. As soon as this line-switch L1 picks up, it locks itself in, through the holding-circuit 51, and remains energized until the main drum M is moved to its off-position, at which time the drum-contact Mq is opened. It may be emphasized that this line-switch L1 can not be initially energized when the braking-drum B is in its special added off-position regenerating-notch R, because then the drum-contact Br is open. However, once the line-switch L1 is actuated, it will hold itself in (or actuated), regardless of the position of the braking-drum B, until the main drum M is moved to its off-notch, at which time the drum-contact Mq opens.

Another point to be emphasized is in connection with the control of the motor-combination electromagnets 39SP and 39P. The series-parallel coil 39SP is energized by the circuit 57 when the main-drum contact Mx is closed, which is on the on-points numbered 17 to 36. The series-parallel motor-connections are established, therefore, when the main drum M is advanced to notch No. 17. It will be noted that the first sixteen on-position notches of the main drum M are used to progressively cut out the accelerating resistances R1, while the motor-combination switch 39 is in its series position, corresponding to a series connection of all six motor-armatures 1 to 6.

When the main controller-drum M is moved from notch No. 16 to notch No. 17, the accelerating resistance R1 (or a substantial part of it) is restored into service, and at the same time the auxiliary main-drum contact Mx closes the control-circuit 57 and energizes the series-parallel coil 39SP, thereby causing the motor-combination changeover-switch 39 to move through its first transition-period from its original series position (Ser.) to its series-parallel position (S. P.), as shown on the block-diagram 39 in Fig. 1. During this first transition-period of the motor-combination changeover-drum 39, the motors 5, 6 and 4 are first short-circuited (by the closure of contact 39g, the contact 39h being already closed); then these short-circuited motors 5, 6 and 4 are immediately disconnected (by the opening of the changeover-contact 39p and the opening of the switch 48 under control of the changeover-contact 39z9 in the control-circuit 59"); and finally these motors 5, 6 and 4 are immediately connected in parallel with the motors 1, 2 and 3 (by the closure of the changeover-contacts 39k and 39r), thus completing the connections for the series-parallel motor-combination.

It is an important feature of my invention that a special holding-circuit 56 is provided, for maintaining the energization of the series-parallel coil 39SP during regenerative braking. Thus, this holding-circuit 56 includes the braking-drum contact Bs, which is closed whenever the braking-drum B is in any one of its on-position regenerating-notches 1 to 13. When this is the case, and when the motor-combination changeover-switch 39 is in its series-parallel position (S. P.), the contact 39z1 of this switch will be closed, completing the aforementioned holding-circuit 56. The importance of this holding-circuit 56 is that, when the main drum is being returned to its off-position, after having established regenerative braking in the series-parallel motor-combination, the series-parallel motor-connections will not be changed or interrupted while the main drum M passes back through the notches 16 to 1, on its way to its off-notch, at which point the line-switch L1 and the series-parallel coil 39SP are both deenergized by reason of the opening of the main-drum contact Mq between the negative bus (—) and the negative conductor N.

In like manner, in the control of the parallel-position coil 39P of the motor-combination changeover-switch 39, the control-circuit 58 shows that this parallel-position coil 39P is energized, in the first place, by the main-drum contact Mz, which is closed on the on-notches Nos. 28 to 36 of the main-drum M. Thus, the parallel motor-combination main-circuit connections are established when the parallel-position coil 39P is energized, when notch No. 28 is reached on the main controller-drum M. The notches 17 to 27 of the main drum M are used to progressively cut out the accelerating resistances R1, while the motor-combination changeover-switch 39 is in its series-parallel position, corresponding to the motor-armatures 1, 2 and 3, in series, being in parallel with the serially connected motor-armatures 5, 6 and 4.

When the main drum M is moved from notch 27 to notch 28, it reinserts the serially connected accelerating resistances R1 (or a substantial portion thereof), and it energizes the parallel-position coil 39P, which causes the motor-combination changeover-switch 39 to move through its second transition-period between its series-parallel position (S. P.) and its parallel-position (Par.), as shown on the block-diagram 39 in Fig. 1. During this second transition-period of the motor-combination changeover-drum 39, the motors 3 and 4 are first individually short-circuited (by the closure of the contacts 39a, 39c, 39u and 39v); then the armatures 3 and 4 and the fields F3 and F4 of these short-circuited motors are all immediately disconnected (by the opening of the changeover-contacts 39e, 39g, 39h, 39s and 39t, and the opening of the switch 46 under control of the changeover-contact 39z5 in the control-circuit 59"); and finally the armatures 3 and 4 and the fields F3 and F4 are connected in series with each other and in parallel with the motors 1 and 2, and in parallel with the motors 5 and 6 (by the closure of the changeover-contacts 39f, 39i, 39m and 39n), thus completing the connections for the parallel motor-combination.

After the notch 28, as the main drum M is moved on, down to its final notch 36, the accelerating resistances R1 are again progressively cut out, with the motors in their parallel motor-combination, in which the motor-armatures 1 and 2, in series with each other, are in parallel with the motor-armatures 3 and 4, in series with each other, and also in parallel with the motor-armatures 5 and 6, in series with each other, thus making three parallel circuits, each containing two motors in series.

Again, in accordance with my invention, a regenerative-operation holding-circuit 58—58' is provided, through the braking-drum contact B$t$, which is closed whenever the braking-drum B is in any of its on-positions 1 to 13. Thus, when regenerative braking-operation has been established, with the motor-armatures in their parallel combination, and with the motor-combination changeover-switch 39 in its parallel-position, the switch-contact 39z3 will be closed, thus completing the holding-circuit through the braking-drum contact B$t$, for maintaining the energization of the parallel-position coil 39P while the main drum M is being moved back, through notches 27 to 1, and thence to the off-notch, at which point the line-switch L1 and the parallel-position coil 39P are both deenergized by reason of the opening of the main-drum contact M$q$ between the negative bus (—) and the negative conductor N.

The regeneration changeover-switch 40 is controlled in a simple manner, by the braking-drum contacts B$u$ (for motoring) and B$w$ (for regenerating), in the control-circuits 59 and 60, respectively. The braking-drum contact B$u$ is energized only when the braking-drum B is in its normal off-position or motoring-position M, thus energizing the motoring-coil 40M of the regeneration changeover-switch 40 whenever the braking-drum B is on its notch M, and whenever the main drum M is on any on-notch 1 to 36, resulting in the closure of the main-drum contact M$q$ between the negative bus (—) and the negative conductor N. On the other hand, the braking-drum contact B$w$ is closed when the braking drum B is either in its new off-position regenerating-notch R or in any one of its on-notches 1 to 13, thus energizing the regeneration-coil 40R as soon as the main drum M is moved off of its off-notch into any one of its on-notches 1 to 36, thus closing the main-drum contact M$q$ and completing the circuit for the regeneration-coil 40R. The regeneration-drum 40 thereupon moves into its regenerating position, and connects the motor-fields F1 to F6 to the exciting generator E, in readiness to be energized by said exciter, whenever the exciter-field EF is energized.

There are three motor-combinations available for regeneration, just as for motoring, thereby giving three distinct regenerative speed-ranges. The speed of the locomotive determines the motor-combination which should be used for regenerative braking. Thus, the last or parallel combination is used if the locomotive is operating above a predetermined speed, for example, 45 miles per hour in the illustrated locomotive. If the locomotive is operating between, say, 30 and 45 miles per hour, the two-thirds or series-parallel combination should be used. Between 15 and 30 miles per hour, for example, the one-third or series combination should be used. No regenerative braking is obtained below approximately 15 miles per hour, with the particular locomotive which has been chosen for an example.

To establish regenerative braking, the main drum M is placed in its off-position. The braking-drum B is then advanced to its new second position R, which holds the line-switch L1, and hence the line-switch L2, open. With the line-switches L1 and L2 thus held open, the main drum M is then advanced to the first notch of the desired motor-combination, namely notch 1, 17, or 28, depending upon the speed of the locomotive at which the regenerative braking is to be applied, as just explained. The braking-drum B is then advanced to whatever notch is required to secure practically zero armature-current in the traction motors, as shown by the armature-current ammeter A-Arm. On notch No. 1 of the braking-drum B, the line-switch L1 is closed by the braking-drum contact B$r$, in the control-circuit 52 of Fig. 1; and at the same time the exciter-field EF is energized through the entire excitation-resistance R2, by the braking-drum contact B$a$.

During the adjustment to zero-current braking-conditions, it is noted that the main drum M is on the first notch of the group of notches corresponding to the selected motor-combination, which means that a maximum amount of accelerating-resistance R1 is in circuit with the motor-armatures. When the field-excitation of the exciter E is first applied, by the closure of the braking-drum contact B$a$ in the No. 1 on-notch of the braking-drum B, all of the exciter-field resistance R2 will be in circuit, and the traction motors will not receive enough excitation to make them act as generators, which would feed power back into the trolley-line 37. Thus, the motors at first act as motors, drawing power from the trolley-line 37, but the amount of this power is small, by reason of the inclusion of the maximum amount of accelerating-resistance R1, used as a cushioning-resistance, in series with the motor-armatures which are connected to the trolley-line 37. When the braking-drum is advanced a sufficient number of notches to reduce the armature-current substantially to zero, the motors are then being excited with the proper amount of excitation to enable them to draw neither motoring-current nor generating-current, and the voltage generated in the motor-armatures will just balance the line-voltage.

After the regenerative motor-excitation has been adjusted approximately to the value for zero armature-current, the main drum M is then advanced to the last notch of the selected motor-combination, that is, to notch 16, 27 or 36, as the case may be. This cuts out substantially all of the accelerating resistance R1. Then the brake-drum is advanced still further, as far as may be necessary to obtain the desired braking-effect.

It is to be noted that while the regenerative motor-combination is being set up, the line-switches L1 and L2 are being held off or open. This effect is obtained by putting the braking-drum B in its notch R while the main drum M is being advanced to the first notch of the desired motor-combination for regenerative braking. In this way, the motors do not pass through either of the transition-periods between the three main running-positions of the motor-combination drum 39, at any time while the motor-fields F1 to F6 are being separately excited, and while the line-switches L1 or L2 are closed. These line-switches L1 and/or L2 are not closed, for braking, until the braking-drum B is moved from its notch R to its notch 1, at which time the main drum M is resting in one of its positions numbered 1, 17 or 28.

If the speed of the locomotive should change enough to require a different motor-combination during regenerative operation, the braking-drum B should be moved back part way toward its No. 1 position, just far enough to make the armature-current zero. The main drum is then returned quickly all the way to its off-position. While the main drum is returning, the previously described regenerative holding-circuits 56 and 58—58' will keep the motor-combination drum 39 in its series-parallel position, or in its parallel position, respectively, if said motor-combination drum 39 had been operating in either one of these two positions. In this way, I prevent the motors from passing through a transition-stage during regeneration, which would result in short-circuiting some of the motors while they are being separately excited. When the main drum M is returned to its off-notch, both the line-switch L1 and the motor-combination coil 39SP or 39P, as the case may be, are deenergized at the main-drum contact M$q$ between the negative bus (—) and the negative conductor N. After all this happens, the braking-drum B is then returned to its new off-position regenerating-notch R, which holds the line-switches L1 and L2 open; and the main drum M can then be advanced to the first notch of the desired new motor-combination, after which the procedure is the same as described hereinbefore.

When it is desired to discontinue regenerative braking, the procedure is the same as in changing to another motor-combination during regeneration, except that, when the main drum M has been returned to its off-position, the braking-drum B is now returned all the way to its conventional off-position or motoring-position M, without stopping at its new regenerating-position R. With the braking-drum B in its motoring-notch M, the main drum M can now be advanced, as in any motoring-operation, to control the motoring-effort by the proper position of the main drum M.

It is customary, in the design of master controllers having a main drum M, a braking-drum B, and usually a reversing-drum (which I have omitted for the sake of simplicity), to provide mechanical interlocks for preventing improper or injurious relative movements of the several drums. My new regenerative control-system, as above described, lends itself to an extremely small number of mechanical interlocking-means, which will suffice to permit the new relative drum-movements which I have described.

In Fig. 2, I have diagrammatically indicated a set of four mechanical interlocks, as shown at positions 2$a$, 2$b$, 2$c$ and 2$d$, connected between the two drum-shafts 61 and 62 of the main drum M and the braking-drum B, respectively. These two drum-shafts 61 and 62 are normally manually operated, as diagrammatically indicated by the handles 63 and 64, respectively, under the control of the engineman. It is practically necessary, however, to provide suitable mechanical interlocks, for physically preventing the engineman from making erroneous relative movements of the main drum and the braking-drum B. Since my regenerative control-system is new, the necessary relative drum-movements are also new, and hence my mechanical interlocking-means involve new features.

In each of the four mechanical interlocking-means 2$a$ to 2$d$, I use a suitable interlocking-cam 61' on the main-drum shaft 61, and a suitable interlocking-cam 62' on the braking-drum shaft 62. These two cams are shaped, in each case, in accordance with the functions which they are to perform, as will be now described, and in each case they are joined by a spring-pressed split-lever 65.

The function of the first mechanical interlock 2$a$ is to lock the braking-drum shaft 62 so that the braking-drum B can not be advanced out of its motoring-notch M, whenever the main drum M is in any position except its off-position, at which time the braking-drum can be moved. Contrary to normal practice, however, I use a split-lever 65 in this first mechanical interlock 2$a$, the split in the lever permitting the main drum M to be moved out of its off-position, after the braking-drum B has been moved out of its motoring-position, in which case the main drum will not lock the motoring drum in position, even when the main drum M is returned to its off-position, so long as the braking-drum B is not returned all the way to its motoring position or notch M.

The second mechanical interlock 2$b$ is for the purpose of preventing the braking-drum B from being moved into any on-position regenerating-notch 1 to 13, while the main drum M is in its off-notch. In other words, when the main drum M is off, the braking-drum B can be moved from its conventional motoring-notch M to its new second position or regenerating-notch R, or vice versa; but said braking-drum B can not be moved into its No. 1 on-position regenerating-notch 1 until the main drum M has been adjusted to some selected notch-position corresponding to the desired motor-combination for regenerative operation, as above described.

The third mechanical interlock 2$c$ is for the purpose of preventing the braking-drum B from being moved back from its No. 1 on-notch to its new second-position regeneration-notch R, or from said regeneration-notch R to its normal motoring-notch M, while the main drum M is in any on-notch. Thus it is required that the main drum M be off, before braking-drum B can be returned from any on-position to either its "R" position or its "M" position, or before the braking-drum B can be returned from its "R" position to its "M" position.

The fourth mechanical interlock is for the purpose of requiring the braking-drum B to be in either one of its first two positions, that is, either in its notch M or its notch R, before the main drum M can be moved in a forward direction past either its off-position, or its No. 16 position, corresponding to the running series operation without any accelerating-resistance R1 in circuit, or past its No. 27 position, corresponding to the running series-parallel operation without any accelerating-resistance R1 in circuit. By this means, the operation of the main drum M is not impeded during normal motoring-operation, at which time the braking-drum B is in its motoring-notch M. In like manner, when the desired motor-combination is being set up for a prospective regenerative operation, the main drum M can be moved to any desired selected position, while the braking-drum B is in its new notch R. However, once the regenerative-braking connections have been completed, by the movement of the braking-drum B into any one of its on-positions 1 to 13, the mechanical interlock 2$d$ comes into play to prevent the main drum M from thereafter being moved into any higher-speed motor-combination notching-group.

In other words, if, during braking, the series or lowest-speed motor-combination is being used, then the main drum M may not be moved past its last series notch 16 into its first series-parallel notch 17. Or if, during braking with the motors in their second-speed combination, that is, their series-parallel combination, then the main drum M can not be moved beyond its last series-parallel notch 27 into its first parallel-combination notch 28. However, the interlocking cam of this fourth mechanical interlock 2d is so shaped that the main drum M can always be returned to its off-position (thanks to the split in the split-lever 65), even while the braking-drum B is on some on-position.

This application is a continuation-in-part of my application Serial No. 148,564, filed March 9, 1950, now abandoned, for Accelerating and Braking Systems for Electric Motors.

While I have illustrated my invention in one particular illustrative form of embodiment, with a very much simplified diagram, I wish it to be understood that I do not consider my invention to be limited to these particular illustrated details, and I desire that the appended claims shall be given the broadest interpretation consistent with their language.

I claim as my invention:

1. In combination, a plurality of electric motors, each having an armature and a series field-winding; a power-conductor; line-switch-means for connecting the motor-armatures to the power-conductor; a multi-position motor-combination switching-means having a plurality of running-positions for connecting the motor-armatures in any one of a plurality of different series and parallel motor-combinations; a separate source of excitation for said field-windings; a two-position regeneration switching-means having a motoring position for energizing the field-windings in series-circuit relation in circuit with their respective motor-armatures, and having a regenerating position for energizing the field-windings from said separate source of excitation; an armature-current controlling-means associated with said power-conductor; an exciting-current controlling-means associated with said separate source of excitation; a main controller-drum having an off-notch and having a plurality of on-notches, said on-notches of the main drum controlling the operations of said motor-combination switching-means and of said armature-current controlling-means; a braking controller-drum having a motoring-notch, an off-position regeneration-notch, and a plurality of on-position regeneration-notches, the off-position regeneration-notch blocking a closure of said line-switch-means, and successive on-position regeneration-notches causing successively higher-current conditions of said exciting-current controlling-means; motoring-operation control-means, responsive to the motoring notch of the braking-drum and the on-notches of the main drum, for closing the line-switch means and causing said regeneration switching-means to be in its motoring position; and regenerating-operation control-means, responsive to the on-notches of the main drum and the on-position regeneration-notches of the braking-drum, for closing the line-switch means and causing said regeneration switching-means to be in its regenerating position.

2. The invention as defined in claim 1, in combination with mechanical interlocking-means for controlling the sequence of operation of said drums.

3. The invention as defined in claim 1, in combination with mechanical interlocking-means for preventing the braking-drum from being moved out of its motoring-notch while the main drum is in any of its on-notches during the operation of said motoring-operation control-means; and mechanical interlocking-means for preventing the braking-drum from being moved into any on-position regenerating-notch while the main drum is in its off-notch.

4. The invention as defined in claim 1, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; and mechanical interlocking-means for preventing the braking-drum from being moved out of its on-group of regenerating-notches while the main drum is in any on-notch.

5. The invention as defined in claim 1, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; and mechanical interlocking-means for preventing the braking-drum from being moved from its off-position regenerating-notch to its motoring-notch while the main drum is in any on-notch.

6. The invention as defined in claim 1, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; and mechanical interlocking-means for preventing the braking-drum from being moved out of its on-group of regenerating-notches, or from its off-position regenerating-notch to its motoring-notch, while the main drum is in any on-notch.

7. The invention as defined in claim 1, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved into its motoring-notch while the main drum is in any on-notch.

8. The invention as defined in claim 1, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches while the main drum is in any on-notch.

9. The invention as defined in claim 1, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches, or from its off-position regenerating-notch to its motoring-notch, while the main drum is in any on-notch.

10. The invention as defined in claim 1, in combination with regenerating-interlocking control-means, responsive to each on-notch of the main drum, and to each on-position regenerating-notch of the braking-drum, for preventing a change in the motor-combination connections.

11. The invention as defined in claim 1, in combination with regenerating-interlocking control-means, responsive to each on-notch of the main drum, and to each on-position regenerating-notch of the braking-drum, for preventing a change to a lower-speed motor-combination; and mechanical interlocking-means for preventing the main drum from being moved forward to any higher-speed motor-combination notch while the braking-drum is in any on-position regenerating-notch.

12. The invention as defined in claim 1, in combination with regenerating-interlocking control-means, responsive to each on-notch of the main drum, and to each on-position regenerating-notch of the braking-drum, for preventing a change to a lower-speed motor-combination; mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches, or from its off-position regenerating-notch to its motoring-notch, while the main drum is in any on-notch.

13. In combination, a plurality of electric motors, each having an armature and a series field-winding; a power-conductor; line-switch-means for connecting the motor-armatures to the power-conductor; a separate source of excitation for the field-windings; an armature-current controlling-means associated with said power-conductor; an exciting-current controlling-means associated with said separate source of excitation; a main controller-drum having an off-notch and having a plurality of on-notches; a braking controller-drum having a motoring-notch, an off-position regeneration-notch, and a plurality of on-position regeneration-notches; motoring-operation control-means, responsive to the motoring-notch of the braking-drum, and to successive on-notches of the main drum, for closing the line-switch means and connecting the motor-armatures and their series field-windings, first in their lowest-speed series motor-combination, with the lowest-speed condition of said armature-current controlling-means, then progressively changing said armature-current controlling-means to its highest-speed condition, then restoring said armature-current controlling-means to its lowest-speed condition and causing a transition to the next-higher-speed parallel motor-combination, and so on, continuously accelerating the motors in response to an advance-movement of the main drum; regeneration-preparation control-means, responsive to the off-position regeneration-notch of the braking-drum, and to the on-notches of the main drum, for enabling the main drum to be moved to any selected on-position in readiness to establish any desired motor-combination of the motor-armatures, and any desired condition of the armature-current controlling-means, without connecting the field-windings in series with the armatures, and without closure of the line-switch means; and regenerating-operation control means, responsive to said selected on-position of the main drum, and to successive on-position regeneration-notches of the braking-drum, for closing the line-switch means, connecting said field-windings to said separate source of excitation, and progressively changing the exciting-current controlling-means to progressively increase the exciting current in response to an advance-movement of the braking-drum.

14. The invention as defined in claim 13, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved into its motoring-notch while the main drum is in any on-notch.

15. The invention as defined in claim 13, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches, or from its off-position regenerating-notch to its motoring-notch, while the main drum is in any on-notch.

16. In combination, a plurality of electric motors, each having an armature and a series field-winding; a power-conductor; line-switch-means for connecting the motor-armatures to the power-conductor; a multi-position motor-combination switching-means having a plurality of running-positions for connecting the motor-armatures in any one of a plurality of different series and parallel motor-combinations, and having transition-positions between successive motor-combination running-positions for effecting transition-connections of the motor-armatures; a separate source of excitation for said field-windings; a two-position regeneration switching-means having a motoring position for energizing the field-windings in series-circuit relation in circuit with their respective motor-armatures, and having a regenerating position for energizing the field-windings from said separate source of excitation; an armature-current controlling-means associated with said power-conductor; an exciting-current controlling-means associated with said separate source of excitation; a main controller-drum having an off-notch and having a plurality of on-notches; a braking controller-drum having a motoring-notch, an off-position regeneration-notch, and a plurality of on-position regeneration-notches, the off-position regeneration-notch blocking a closure of said line-switch-means, and successive on-position regeneration-notches causing successively higher-current conditions of said exciting-current controlling-means; and regenerating-operation control-means, responsive to each on-notch of said main drum, and to each on-position regeneration-notch of the braking-drum, for causing said regeneration switching-means to be in its regenerating position, and for causing a closure of said line-switch means, and for preventing any backward movement of the motor-combination switching-means.

17. The invention as defined in claim 16, in combination with mechanical interlocking-means for preventing the main drum from being moved forward to any higher-speed motor-combination notch while the braking-drum is in any on-position regenerating-notch.

18. The invention as defined in claim 16, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is is its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches, or from its off-position regeneration-notch to its motoring-notch, while the main drum is in any on-notch.

19. In combination, a plurality of electric motors, each having an armature and a series field-winding; a power-conductor, line-switch-means for connecting the motor-armatures to the power-conductor; a multi-position motor-combination switching-means having a plurality of running-positions for connecting the motor-armatures in any one of a plurality of different series and parallel motor-combinations, and having transition-positions between successive motor-combination running-positions for effecting transition-connections of the motor-armatures; a separate source of excitation for said field-windings; a two-position regeneration switching-means having a motoring position for energizing the field-windings in series-circuit relation in circuit with their respective motor-armatures, and having a regenerating position for energizing the field-windings from said separate source of excitation; an armature-current controlling-means associated with said power-conductor; an exciting-current controlling-means associated with said separate source of excitation; a main controller-drum having an off-notch and having a separate notching-group of at least two on-notches for each motor-combination, the first notch of each notching-group causing the lowest-speed condition of said armature-current controlling-means, and the last notch of each notching-group causing the highest-speed condition of said armature-current controlling-means, for that motor-combination, the successive motor-combination notching-groups causing successive advances in the position of the motor-combination switching-means; a braking controller-drum having a motoring-notch, an off-position regeneration-notch, and a plurality of on-position regeneration-notches, the off-position regeneration-notch blocking a closure of said line-switch-means, and successive on-position regeneration-notches causing successively higher-current conditions of said exciting-current controlling-means; control-means, responsive to the motoring-notch of said braking-drum, and to each on-notch of said main drum, for causing said regeneration switching-means to be in its motoring position, and for causing a closure of said line-switch means; control-means responsive to each on-notch of said main drum, and to each on-position regeneration-notch of the braking-drum, for causing said regeneration switching-means to be in its regenerating position, and for causing a closure of said line-switch means, and for preventing any backward movement of the motor-combination switching-means; and control-means, responsive to the off-notch of the main drum, and to a position of the braking-drum in one of its first two positions including the motoring-notch and the off-position regeneration-notch, for causing the motor-combination switching-means to move to its lowest-speed series position.

20. The invention as defined in claim 19, in combination with mechanical interlocking-means for preventing the main drum from being moved forward to any higher-speed motor-combination notch while the braking-drum is in any on-position regenerating-notch.

21. The invention as defined in claim 19, in combination with mechanical interlocking-means for preventing the braking-drum from being moved out of its motoring-notch while the main drum is in any of its on-notches during the operation of said motoring-operation control means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches, or from its off-position regenerating-notch to its motoring-notch, while the main drum is in any on-notch.

22. In combination, a plurality of electric motors, each having an armature and a series field-winding; a power-conductor; line-switch-means for connecting the motor-armatures to the power-conductor; a multi-position motor-combination switching-means having a plurality of running-positions for connecting the motor-armatures in any one of a plurality of different series and parallel motor-combinations, and having transition-positions between successive motor-combination running-positions for effecting transition-connections of the motor-armatures; a separate source of excitation for said field-windings; a two-position regeneration switching-means having a motoring position for energizing the field-windings in series-circuit relation in circuit with their respective motor-armatures, and having a regenerating position for energizing the field-windings from said separate source of excitation; an accelerating-resistance-means in series-circuit relation in circuit with the motor-armatures; an excitation-controlling resistance-means associated with said separate source of excitation; a main controller-drum having an off-notch and having a separate notching-group of at least two on-notches for each motor-combination, the first notch of each notching-group including a substantial portion of said accelerating-resistance-means in circuit, and the last notch of each notching-group cutting out substantially all of said accelerating-resistance-means, the successive motor-combination notching-groups causing successive advances in the position of the motor-combination switching-means; a braking controller-drum having a motoring-notch, an off-position regeneration-notch, and a plurality of on-position regeneration-notches, the off-position regeneration-notch blocking a closure of said line-switch-means, and successive on-position regeneration-notches progressively cutting out said excitation-controlling resistance-means; control means, responsive to the motoring-notch of said braking-drum, and to each on-notch of said main drum, for causing said regeneration switching-means to be in its motoring position, and for causing a closure of said line-switch means; control-means responsive to each on-notch of said main drum, and to each on-position regeneration-notch of the braking-drum, for causing said regeneration switching-means to be in its regenerating position, and for causing a closure of said line-switch means, and for preventing any backward movement of the motor-combination switching-means; and control-means, responsive to the off-notch of the main drum, and to a position of the braking-drum in one of its first two positions including the motoring-notch and the off-position regeneration-notch, for causing the motor-combination switching-means to move to its lowest-speed series position.

23. The invention as defined in claim 22, in combination with mechanical interlocking-means for preventing the main drum from being moved forward to any higher-speed motor-combination notch while the braking-drum is in any on-position regenerating-notch.

24. The invention as defined in claim 22, in combination with mechanical interlocking-means for preventing the braking-drum from being moved out of its motoring-notch while the main drum is in any of its on-notches during the operation of said motoring-operation control-means; mechanical interlocking-means for preventing the braking-drum from being moved into any on-position regenerating-notch while the main drum is in its off-notch; mechanical interlocking-means for preventing the main drum from being moved forward to any higher-speed motor-combination notch while the braking-drum is in any on-position regenerating-notch; and mechanical interlocking-means for preventing the braking-drum from being moved out of its on-group of regenerating-notches, or from its off-position regenerating-notch to its motoring-notch, while the main drum is in any on-notch.

CYRIL E. BASTON.

REFERENCES CITED

The following references are of record in the file of this patent:

UNITED STATES PATENTS

| Number | Name | Date |
|---|---|---|
| 1,961,887 | Lejeune | June 5, 1934 |